(12) United States Patent
Tanji

(10) Patent No.: US 6,737,819 B2
(45) Date of Patent: May 18, 2004

(54) MOTOR RETRACTOR SYSTEM

(75) Inventor: Hiromasa Tanji, Kyoto (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/084,312

(22) Filed: Feb. 28, 2002

(65) Prior Publication Data

US 2002/0130545 A1 Sep. 19, 2002

(30) Foreign Application Priority Data

Mar. 19, 2001 (JP) .......................... 2001-077998

(51) Int. Cl.$^7$ .............. H02K 7/14; H02P 1/00
(52) U.S. Cl. .............. 318/3; 318/6; 280/801.1; 280/808; 180/268; 297/464; 297/468
(58) Field of Search ................ 318/4, 5, 3, 6, 318/7; 297/464, 468, 474, 475, 483, 486; 280/807, 801.1, 803; 180/268

(56) References Cited

U.S. PATENT DOCUMENTS

| 4,655,312 A | 4/1987 | Frantom et al. |
| 5,558,370 A | 9/1996 | Behr |
| 5,634,664 A | 6/1997 | Seki et al. |
| 5,788,281 A | 8/1998 | Yanagi et al. |
| 6,267,409 B1 * | 7/2001 | Townsend et al. ....... 280/801.1 |

FOREIGN PATENT DOCUMENTS

| JP | 6-255447 | 9/1994 |
| WO | 00/21801 | 4/2000 |

* cited by examiner

*Primary Examiner*—Rina Duda
*Assistant Examiner*—Renata McCloud
(74) *Attorney, Agent, or Firm*—Kanesaka & Takeuchi

(57) ABSTRACT

A motor retractor system includes a first winding device having a motor for driving a shoulder belt in a winding direction, and a second winding device having a tension-applying device for always applying a tension in a winding direction to a lap belt extending from the shoulder belt through a through-tongue. A control unit controls the motor to drive when the through-tongue coupled to the buckle is released from the buckle. Therefore, the shoulder belt can be smoothly pulled out. When the through-tongue is buckled up, an occupant can be restrained by the seat belt with a comfortable force and no slack. When the through-tongue is released from the buckle, the seat belt can be promptly withdrawn to the first winding device.

4 Claims, 5 Drawing Sheets

MOTOR RETRACTOR SYSTEM

BACKGROUND OF THE INVENTION AND RELATED ART STATEMENT

The present invention relates to a motor retractor system, in which when pulling out a seat belt, a winding device motor does not wind the belt, and when an occupant releases the seat belt restraint, the motor winds the seat belt.

In a conventional retractor equipped in an automobile, a seat belt or webbing is pulled out with a through-tongue from a spool of a winding device or retractor fitted in the automobile, and the through-tongue engages a buckle. An occupant is restrained in a seat by tension in the winding direction of the seat belt pulled out from the spool.

However, because of constant contact of the seat belt with a body, if the tension is too large, the occupant might feel discomfort by the large oppressing force. On the other hand, if the tension is too small, the retracting force is insufficient to wind the seat belt smoothly.

Also, in a conventional retractor, since a single return spring is built therein, an urging force of the return spring increases with pulling out the seat belt, resulting in an enlarged retracting force.

As means for solving the problem associated with the single return spring, a tension-reducer mechanism comprising two truncated cone-shaped rope pulleys with spiral guide grooves has been developed (disclosed in Japanese Patent No. 2711428).

In addition to securely restraining and protecting an occupant upon an emergency, a seat belt winding device for an occupant restraint and protection system has been also developed (disclosed in Japanese Patent Publication No. 9-132113), in which an electric motor controls the seat belt tension by detecting a distance to other vehicles in front and behind during moving, and comfort performance of wearing the belt under a normal condition is improved.

However, for the most of the seat-belt retractors using a motor, the motor control is needed to monitor the seat belt pulled out by an occupant, the position of the seat belt, tension of the seat belt, and the amount of a spool rotation, via various sensors and encoders. Further, when an electrical signal or an electrical power is lost, auxiliary means is needed to operate the seat belt restraining, and a direct spring force can spoil the comfort performance.

In order to solve the problems described above, it is an object of the present invention to provide a motor retractor system capable of restraining an occupant in a seat with a comparatively small force without excessive pressing, and quickly storing the seat belt into a winding device or retractor upon releasing the seat belt, while easy pull-out of the seat belt can be comfortably performed.

Further objects and advantages of the invention will be apparent from the following description of the invention.

SUMMARY OF THE INVENTION

In order to achieve the above-mentioned objects, a motor retractor system according to the first aspect of the invention comprises a first winding device having a motor for driving a shoulder belt in the winding direction, and a second winding device having a tension-applying device for applying a constant tension in the winding direction to a lap belt extending from the shoulder belt through a through-tongue. A control unit controls the motor to drive when the through-tongue coupled to a buckle is released from the buckle. Therefore, the shoulder belt can be smoothly pulled out, and when the through-tongue is buckled up, an occupant can be restrained by the seat belt with a comfortable force and no slack. When the through-tongue is released from the buckle, the seat belt can be promptly withdrawn to the first winding device.

In a motor retractor system according to the second aspect of the invention, the control unit may drive the motor in the first winding device in the winding direction when the through-tongue is released from the buckle. Therefore, the first winding device can wind the seat belt promptly.

A motor retractor system according to the third aspect may further comprise belt-storage detecting means disposed in the first winding device and the second winding device for detecting a state of the shoulder belt or the lap belt. Therefore, the seat belt length wound in the first winding device and pulled out of the second winding device can be precisely monitored and controlled.

In a motor retractor system according to the fourth aspect of the invention, when an occupant is wearing the shoulder belt and the lap belt, only the second winding device creates a winding force, and the first winding device does not drive. Therefore, the occupant can be comfortably restrained in the seat due to a small force of the second winding device.

In a motor retractor system according to the fifth aspect of the invention, when the detecting means confirms that the belt is wound up to a predetermined point, the first winding device may stop winding the shoulder belt. Therefore, the seat belt can be pulled out again.

DETAILED DESCRIPTION OF PREFERRED EMBODIMENTS

Figure 1:
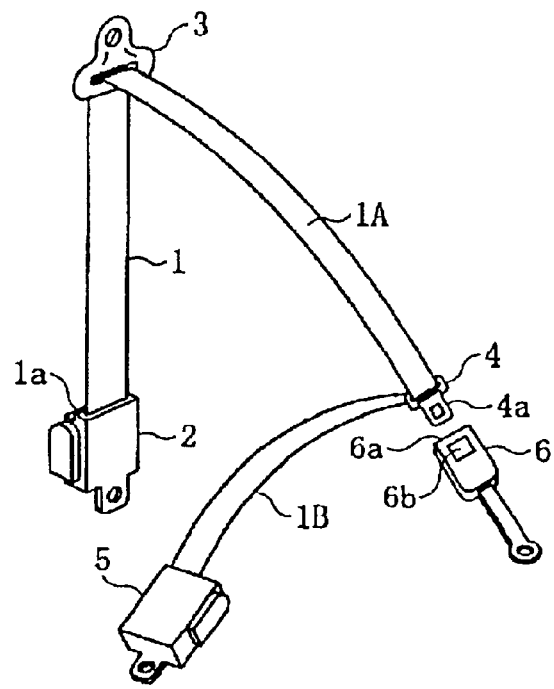
FIG. 1 is a perspective view of a motor retractor system according to an embodiment of the present invention.
Figure 2:
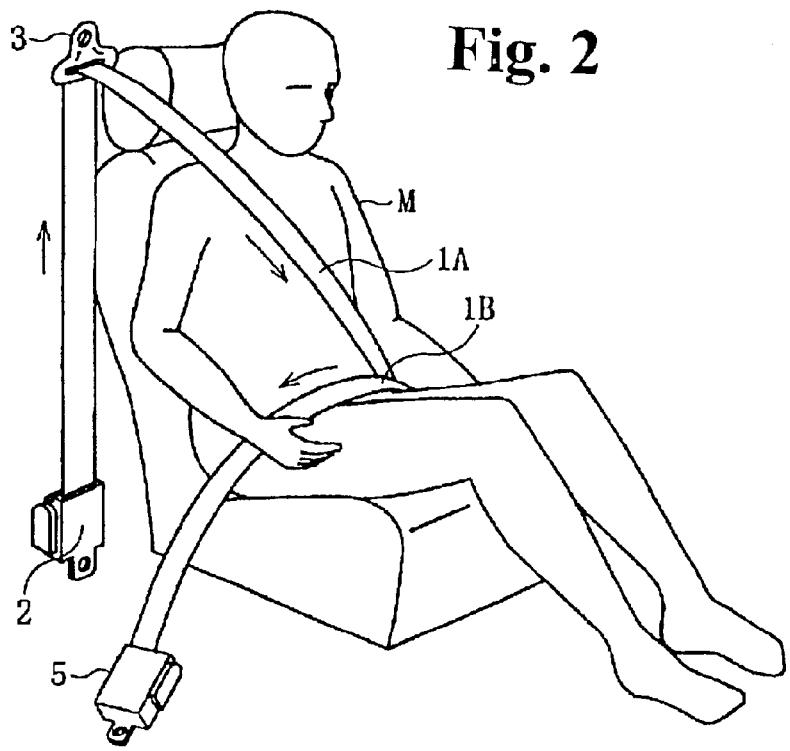
FIG. 2 is a perspective view of the motor retractor system shown in FIG. 1 in a using state.

Hereunder, embodiments according to the present invention will be described with reference to the accompanied drawings. FIGS. 1 and 2 are a perspective view of a motor retractor system according to the present invention, and a schematic representation of a method for using the motor retractor system, respectively. In the drawings, numeral reference 1 denotes a continuous webbing, one end 1a of which is fixed to and wound onto a spool in a first winding device 2 disposed in the vicinity of a floor within a pillar (not shown). The continuous webbing is extending upwardly and then guided obliquely downwardly through a through-anchor 3 attached to an upper end of the pillar, and it forms a shoulder belt 1A from the guided point. Furthermore, the shoulder belt 1A is folded back by a through-tongue 4, with which the shoulder belt 1A is brought into the vicinity of the boundary to an adjacent seat, so as to form a lap belt 1B over the seat.

Also, the end of the lap belt 1B is wound onto and fixed to a spool in a second winding device 5 disposed on the floor.

The through-tongue 4 can be coupled to a buckle 6 disposed at a predetermined position between adjacent seats, and when being coupled, a chest and a pelvis of an occupant M are simultaneously restrained. The through-tongue 4 and the buckle 6 are similar in strength and design to those used in a conventional seat belt apparatus, and when wearing the seat belt, a tongue plate 4a of the through-tongue 4 is inserted into and coupled to a retainer hole 6a of the buckle 6. In order to release the through-tongue 4 therefrom, by pressing a press button 6b of the buckle 6 to operate a built-in rejecting mechanism, the connection can be easily released.

Figure 3:
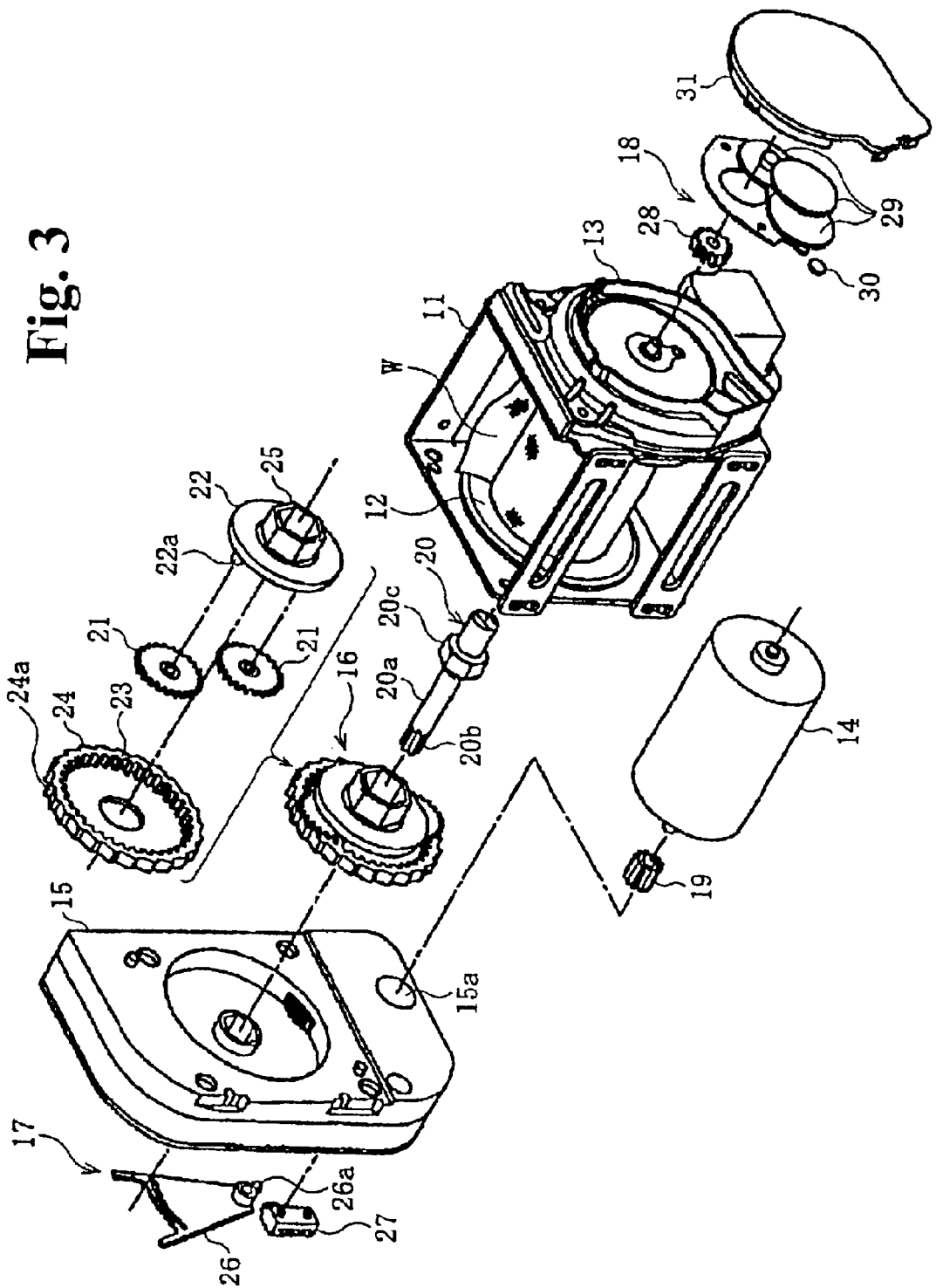
FIG. 3 is an exploded perspective view schematically showing the first winding device shown in FIG. 1.

As shown in an exploded perspective view of FIG. 3, the first winding device 2 comprises a spool 12 that is rotationally supported to a U-shaped base frame 11 and has a circumferential surface for winding one end of the continuous webbing W (1); a spool-locking mechanism 13 disposed integrally with the base frame 11 for locking the rotation of the spool 12; a motor 14 as a driving source of a spool shaft 20; a reduction mechanism casing 15 having a reduction mechanism accommodated therein; a planetary gear unit 16 forming a part of the reduction mechanism; a webbing-pullout detector 17 for controlling the motor; and a spool-rotation detector 18.

The reduction mechanism has two reduction systems, and the spool 12 is wound via any one of the two systems. On a sidewall of the base frame 11, a supporting hole (not shown), to which a flange of the spool 12 is loosely fitted, is formed. An engagement pawl, which rotates by a movement of the spool-locking mechanism 13, is engaged with a saw-tooth portion formed on the internal circumference of the supporting hole. Therefore, due to this engaging operation, when the continuous webbing W is rapidly pulled out, the rotation of the spool 12 is locked so as to stop the pullout of the continuous webbing W.

The motor 14 has a motor gear 19 fitted to a driving shaft of the motor 14, and the motor gear 19 is meshed with a two-stage gear (not shown) inside the reduction mechanism casing 15 through a lower hole 15a thereof, and the two-stage gear is engaged with a reduction gear. A rotation shaft boss of the reduction gear is fitted to a bush coaxially formed with a sun gear fitted to a protruding shaft 20a of the spool shaft 20, so that the entire reduction gear is supported with the protruding shaft 20a as an axis. On a side surface of the reduction gear, a rotary damper (not shown) for applying a resistance torque is disposed. In the reduction gear, accommodated is a spool-shaft input gear (not shown) fixed to a hexagonal spline 20b at the end of the protruding shaft 20a. By the rotation of the spool-shaft input gear, a predetermined rotational torque is applied to the spool shaft 20.

The planetary gear unit 16 comprises two planetary gears 21 meshed with the sun gear rotating together with the reduction gear; a carrier 22 coaxially rotating with the sun gear for supporting the planetary gears 21 on shafts 22a; and an internal gear 24 having internal gear teeth 23 engaging the planetary gears 21. The carrier 22 has a hexagonal socket 25 formed at a backside, and a hexagonal shaft portion with an increased diameter 20c of the spool shaft 20 is fitted into the socket 25. The external circumference of the internal gear 24 has ratchet teeth 24a formed therein. When a claw mechanism (not shown) engages the ratchet teeth 24a to stop the internal gear 24, the rotation from the sun gear is transmitted to the carrier 22 rotating together with planetary gears 21 so as to enable the spool shaft to rotate via the socket 25 at a large reduction ratio.

In addition, the webbing-pullout detector 17 turns on a limit switch 27 by a protruded piece 26a of a switch plate 26 in accordance with the spool-shaft input gear so as to detect webbing pullout and stop the motor 14. The spool-rotation detector 18 disposed on an outside of the spool-locking mechanism 13 comprises a gear 28 attached at an end of the spool shaft 20; three gear trains 29 for reducing the rotation of the gear 28; and a potentiometer 30 for measuring the reduced rotational angle as electrical resistance. The potentiometer 30 is belt-storage detecting means described later. Numeral reference 31 denotes a cover for covering the potentiometer 30 and the gear train 29.

Therefore, in the first winding device 2, by transmitting the rotation of the motor 14 to the spool shaft 20 via the reduction mechanism and the planetary gear unit 16 in the reduction mechanism casing 15, the continuous webbing is wound on the spool 12. When an electric current to the motor 14 is stopped, the spool shaft 20 is free to rotate together with the reduction mechanism and the planetary gear unit 16. However, due to resistance from the gear ratio and friction in the reduction mechanism and the planetary gear unit 16, the spool 12 will not rotate freely, so that the continuous webbing is not pulled out by itself.

The motor 14 is driven in a winding direction of the shoulder belt 1A only when the through-tongue 4 is released from the buckle 6. When the shoulder belt 1A is stored in the first winding device 2, since the motor 14 is out of power, the shoulder belt 1A can be pulled out smoothly from the spool 12 in the first winding device 2. In addition, when a gear ratio of the reduction mechanism is large, mechanical hysteresis is generated. Therefore, together with another hysteresis due to the friction of the through-anchor 3 and the shoulder belt 1A, the shoulder belt 1A is not pulled out from the first winding device 2 freely as mentioned above. The first winding device 2 has the potentiometer 30 as belt-storage detecting means for detecting a stored state of the shoulder belt 1A.

Figure 4:
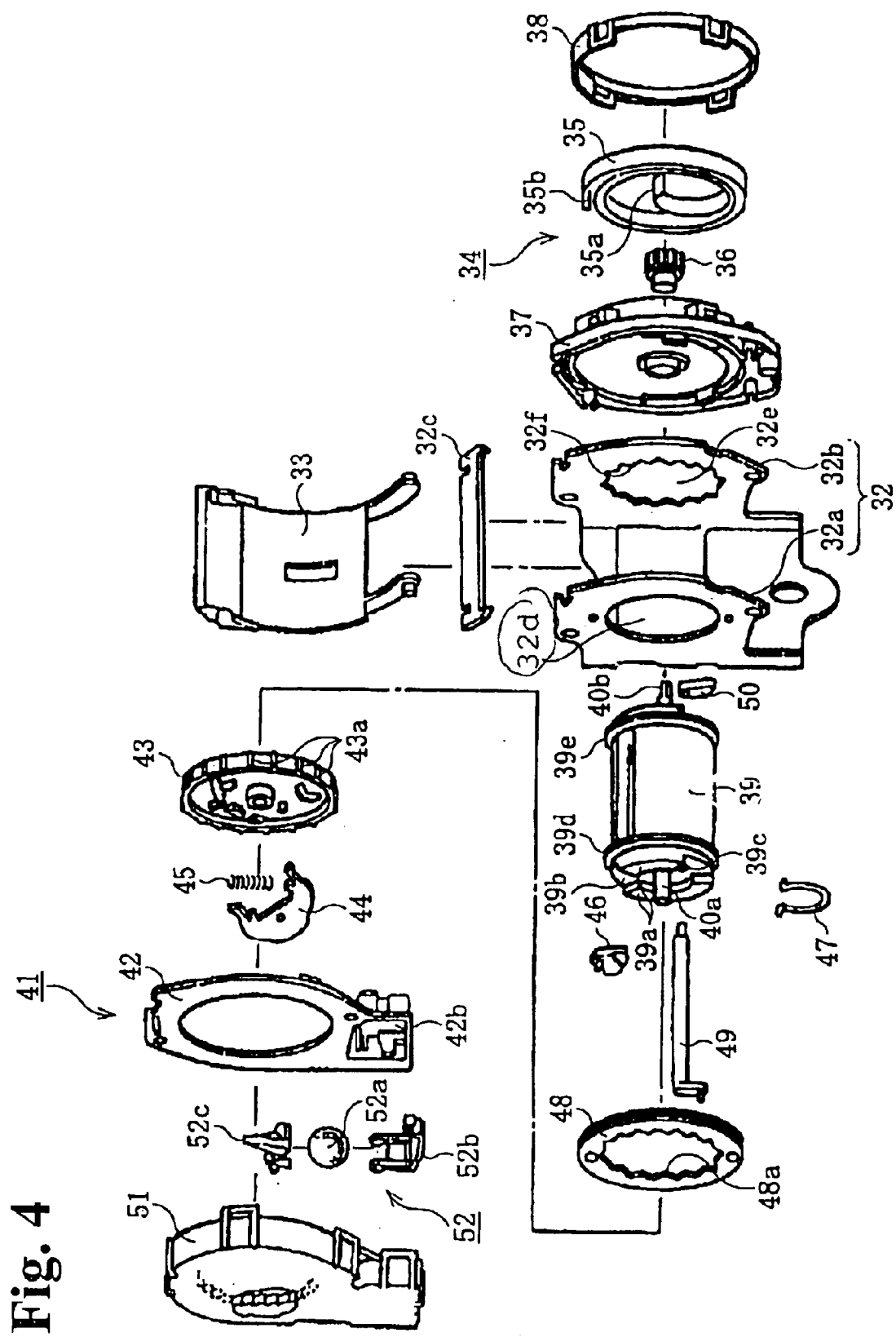
FIG. 4 is an exploded perspective view schematically showing the second winding device shown in FIG. 1.

The second winding device 5, as shown in FIG. 4, comprises a substantially U-shaped frame 32 having sidewalls 32a and 32b at both sides. They are reinforced with a connecting member 32c for connecting them. Numeral reference 33 denotes a webbing guide for covering a front side of the frame 32. The left sidewall 32a has a circular opening 32d formed thereon, and the right sidewall 32b has a circular opening 32e with angular teeth 32f formed in the internal periphery thereof.

A tension-applying device 34 for winding the seat belt is attached to the right sidewall 32b. The tension-applying device 34 comprises a spiral spring 35; a bush 36 connected to the internal peripheral end 35a of the spiral spring 35 so that a spring force is applied thereto; a spring case 37 for fixing the external peripheral end 35b of the spiral spring 35 and accommodating the spiral spring 35 therein; and a cover 38 attached to the spring case 37.

Between the sidewalls 32a and 32b of the frame 32, a reel shaft 39 for winding the lap belt 1B is arranged. Rotation shafts 40a and 40b are disposed at the centers of sidewalls of the reel shaft 39. A pair of projections 39a is formed on the left sidewall of the reel shaft 39, and an interstice 39b is formed between them. A recess (not shown) is formed on the left sidewall, and an axial direction hole 39c is formed on the interstice 39b and the recess. Numeral references 39d and 39e denote flanges disposed in the external peripheries at both ends of the reel shaft 39 for guiding the lap belt.

Furthermore, on the left sidewall 32a of the frame 32, seat-belt locking operating means 41 is arranged. The seat belt locking operating means 41 comprises a retainer 42 fixed to the left sidewall 32a; a locking gear 43; an inertial element 44 attached to the locking gear 43 to swing freely; a control spring 45 arranged between the locking gear 43 and the inertial element 44; a main pawl 46 arranged in the interstice 39b of the reel shaft 39; an Ω-shaped return spring 47 arranged between the reel shaft 39 and the main pawl 46; an internal gear 48 fixed to the left sidewall 32a together with the retainer 42 and having angular teeth 48a formed in the internal periphery thereof; a joint pin 49 inserted into the axial direction hole 39c; a backup pawl 50 connected to one end of the joint pin 49; and a cover 51 for covering the locking gear 43.

The retainer 42 has a large hole for accommodating the internal gear 48 at the center. At a lower portion of the retainer 42, attached are a fitting part 42b for fitting deceleration sensing means 52 comprising an inertial ball 52a, a supporting bed 52b for supporting the inertial ball 52a, and an actuator 52c attached to the supporting bed 52b. The actuator 52c rotates when the inertial ball 52a moves. In addition, a potentiometer (not shown) is attached to the rotation shaft 40a or 40b as belt-storage state detecting means.

In the second winding device 5, in a state that a vehicle is not under deceleration, the actuator 52c will not rotate, since the inertial ball 52a on the supporting bed 52b in the deceleration sensing means 52 does not move. In such a state, the actuator 52c does not engage teeth 43a of the locking gear 43. An engaging claw of the inertial element 44, the main pawl 46, and the back-up pawl 50 are also not engaged. Therefore, in the second winding device 5, the tension-applying device 34 works. Accordingly, the reel shaft 39 is urged in the winding direction of the lap belt 1B due to the spring force of the spiral spring 35, and the lap belt webbing 1B is to be wound. When the seat belt is not used, since the through-tongue 4 is detached from the buckle 6, the lap belt 1B is in the wound state as described above.

When the lap belt 1B is pulled out together with the shoulder belt 1A, the reel shaft 39 and the bush 36 rotate in the pullout direction, so the spiral spring 35 is wound and tightened. When an occupant connects the through-tongue 4 to the buckle 6 after pulling out the seat belt, the shoulder belt 1A and the lap belt 1B are pulled out longer than a regular wearing state. Then, when the occupant stops pulling out and release the seat belt, each of the belts 1A and 1B is wound until it fits the body of the occupant by the spring force of the spiral spring 35. At this time, the spring force of the spiral spring 35 is adjusted so that the occupant does not feel too tight. During the drive of a vehicle, this state is maintained as long as the vehicle is not decelerated.

During the driving of a vehicle, when the vehicle decelerates due to an abrupt braking, etc., the inertial ball 52a in the deceleration sensing means 52 moves, and the actuator 52c rotates. Accordingly, the engaging claw of the actuator 52c engages the teeth 43a in the external periphery of the locking gear 43. At this time, an occupant body moves forwardly due to the deceleration, so that the reel shaft 39 and the locking gear 43 are going to rotate in the pullout direction of the lap belt 1B. However, the rotation of the locking gear 43 is immediately stopped by an engagement between the inertial element 44 and the stopper on the locking gear 43. As a result, only the reel shaft 39 rotates in the pullout direction, so that the relative rotation between the locking gear 43 and the reel shaft 39 is produced.

Also, by the relative rotation, the main pawl 46 and the back-up pawl 50 rotate and engage the teeth 48a and the teeth 32f, respectively. Therefore, the reel shaft 39 is restricted from rotating in the pullout direction, so that the lap belt 1B is securely locked and not pulled out by an inertia of the occupant body.

Figure 5:
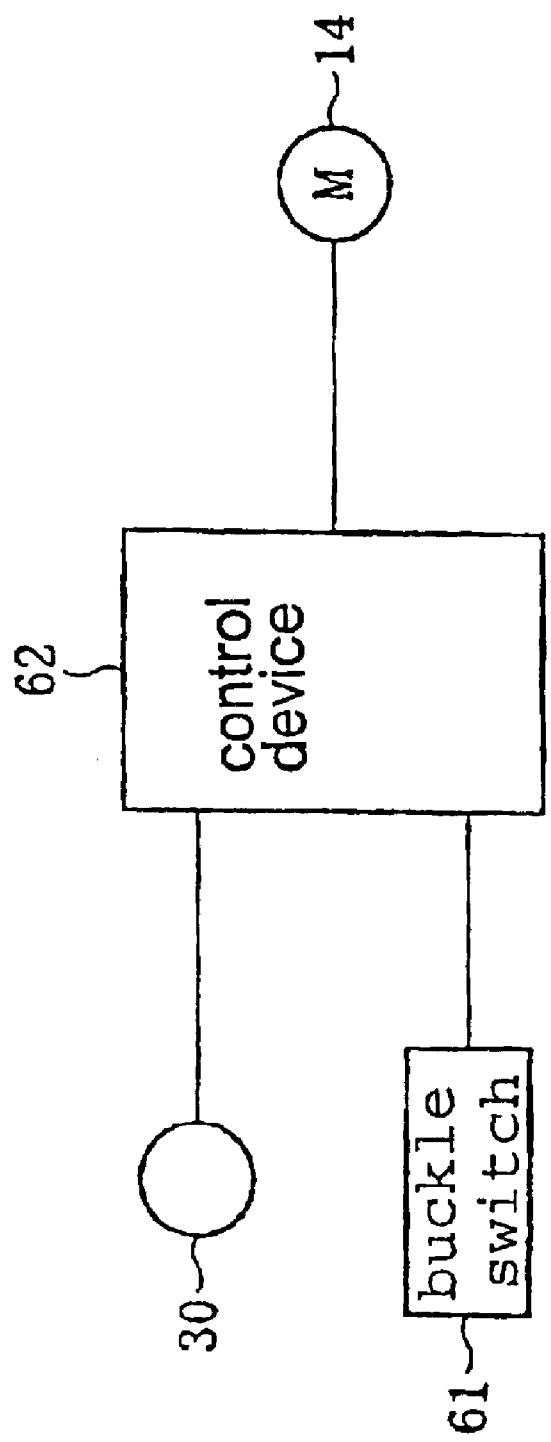
FIG. 5 is a block diagram of a control device for driving the motor shown in FIG. 3.

FIG. 5 shows a control circuit for controlling the motor 14. The control circuit comprises a buckle switch 61 for detecting insertion and release of the through-tongue 4 with respect to the buckle 6; the potentiometer 30 for detecting rotation of the motor 14; and a control device 62 for driving the motor 14 in the winding direction of the shoulder belt 1A when the buckle switch 61 is off. The control device 62 always monitors a stored state of the shoulder belt 1A based on an output of the potentiometer 30, and it stops driving the motor 14 when the winding amount reaches a predetermined value.

Figure 6A:
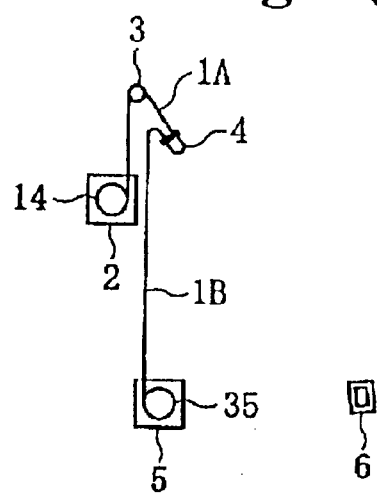
FIGS. 6(a)–6(f) are schematic representations sequentially showing an operation of the motor retractor system according to an embodiment of the present invention.

Next, operation of the motor retractor system will be described with reference to FIGS. 6(a)–6(f). First, when an automobile is parked in a garage, etc., the seat belt is not used, as shown in FIG. 6(a), so that the shoulder belt 1A is wound onto the spool 12 in the first winding device 2 and is stored therein, while the lap belt 1B is stored onto the reel shaft 39 in the second winding device 5 due to the winding force of the spiral spring 35 in the tension-applying device 34. When an occupant sitting on a seat pulls the shoulder belt 1A downwardly with grabbing the through-tongue 4 in the vicinity of the through-anchor 3 to use the seat belt, the shoulder belt 1A is pulled out of the first winding device 2 via the through-anchor 3.

Figure 6D:
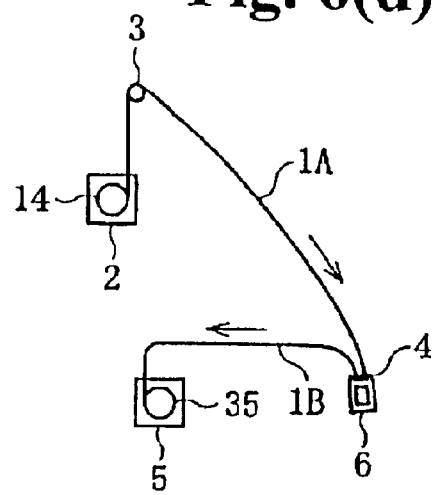
Figure 6B:
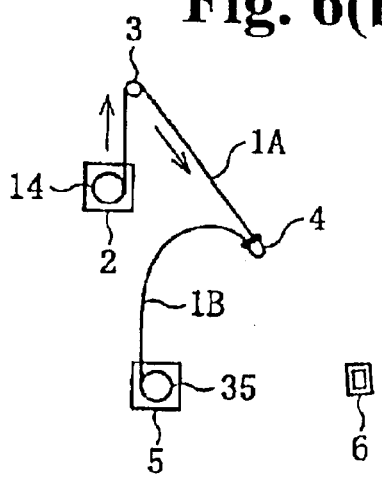

Since the control device 62 does not supply an electric current to the motor 14 at this time, the shoulder belt 1A can be pulled out smoothly with a predetermined small holding-resistance due to mechanical hysteresis of the reduction mechanism and the planetary gear unit 16. In addition, also due to hysteresis between the through-anchor 3 and the shoulder belt 1A, a small holding resistance is produced between them. By the pullout operation of the shoulder belt 1A, the lap belt 1B is slightly pulled out from the reel shaft 39 in the second winding device 5 against the spring force of the spiral spring 35, as shown in FIG. 6(b).

Figure 6E:
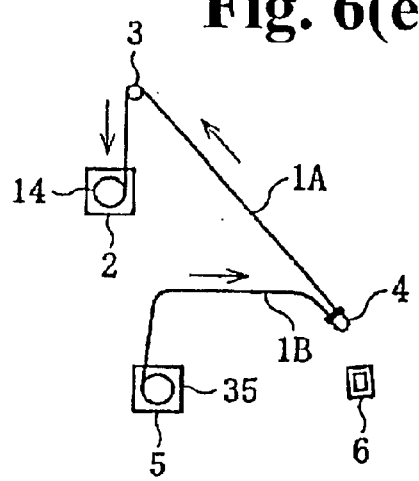
Figure 6C:
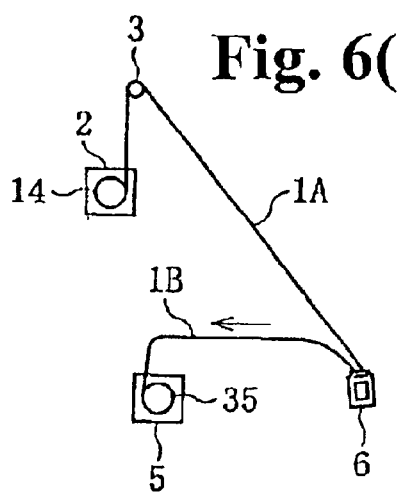

When the shoulder belt 1A is pulled out together with the lap belt 1B, and the through-tongue 4 is coupled to the buckle 6, as shown in FIG. 6(c), the shoulder belt 1A stays at the pull out position by hysteresis of the through-anchor 3 and the through-tongue 4. A small tension by the spiral spring 35 is applied to the lap belt 1B. Therefore, the pelvis of the occupant on the seat is restrained by the tension; however, it does not cause tight feeling. Also, slack of the shoulder belt 1A is eliminated by the small tension.

Since the motor 14 is off in this state, no electricity is consumed during sitting on the seat and driving a vehicle. Even when the occupant moves a little on the seat for some reason, as shown in FIG. 6(d), the shoulder belt 1A is smoothly pulled out from the first winding device 2. At this time, the tension of the spiral spring 35 is applied to the lap belt 1B as a restraint force. In addition, the spiral spring 35 works as a fail-safe system when the power supply to the motor 14 and the control device 62 is down, etc.

When the through-tongue 4 is released from the buckle 6 by pushing the press button 6b upon leaving the vehicle, the buckle switch 61 is turned on, so that via the turning-on signal, the control device 62 supplies a predetermined amount of electric current to the motor 14. The motor 14 winds the shoulder belt 1A up onto the spool 12 by a pulled out length. As a result, the lap belt 1B, which is wound on the reel shaft 39, is withdrawn for the pulled length of the shoulder belt 1A. Then, the potentiometer 30 detects a point where the shoulder belt 1A is wound on the spool 12 by the pulled out length, while the potentiometer (not shown)

detects a wound amount of the lap belt 1B on the reel shaft 39, so that the control device 62 stops driving the motor 14, returning to a state before the seat belt is used.

Figure 6F:
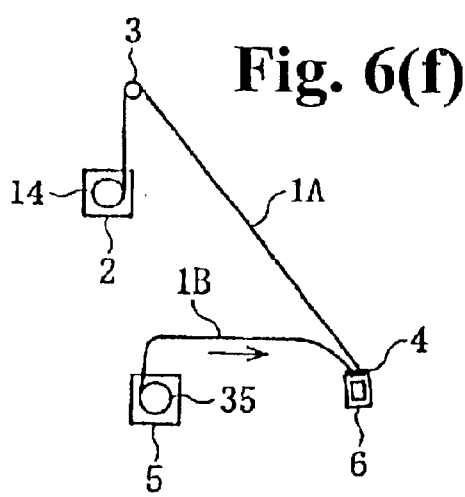

In addition, this operation is effective when the shoulder belt 1A is wound sufficiently onto the spool 12 of the first winding device 2 in such an extent that the belt is not run out. However, there may be a case that the shoulder belt 1A is run out depending on a movement of the occupant, as shown in FIG. 6(e). In this case, a potentiometer 30 detects the run-out of the shoulder belt 1A, so that the control device 62 operates to provide electricity to the motor 14 to turn the spool 12 in the winding direction to thereby withdraw the lap belt 1B from the reel shaft 39 by a necessary length, as shown in FIG. 6(f), so as to accommodate the occupant movement. At this time, the spiral spring 35 with a small winding force may be used.

When the reduction mechanism in the first winding device 2 has a small reduction ratio, the motor 14 and the spool 12 can be directly connected as needed to rotate the motor shaft of the motor 14 simultaneously upon pulling out the shoulder belt 1A. When a reduction ratio is large, the shoulder belt 1A may be pulled out regardless of the shaft holding torque of the motor 14 with separating the motor shaft of the motor 14 from the spool 12 by a clutch, etc. In addition, the stored state of the shoulder belt 1A or the lap belt 1B may be detected by not only the potentiometer 30 but also a device to detect an electric current level flowing through the motor 14, a timer to measure a winding time of each belt, or a device to detect the winding torque at a predetermined value (current measurement).

As described above, according to the present invention, the motor retractor system includes the first winding device having the motor for driving the shoulder belt in the winding direction, and the second winding device having the tension-applying device for applying a constant tension in the winding direction to the lap belt extending from the shoulder belt through the through-tongue. The control unit controls the motor to drive when the through-tongue coupled to the buckle is released from the buckle. Therefore, the shoulder belt can be smoothly pulled out, and when the through-tongue is buckled up, an occupant can be restrained by the seat belt with a comfortable force and no slack. When the through-tongue is released from the buckle, the seat belt can be promptly retracted to the first winding device.

The control unit may drive the motor in the first winding device in the winding direction when the through-tongue is released from the buckle. Thus, the first winding device can wind the seat belt promptly. Further, the belt-storage detecting means is disposed in the first winding device and the second winding device for detecting a state of the shoulder belt or the lap belt. Thus, the seat belt length wound in the first winding device and pulled out of the second winding device can be precisely monitored, making it possible to control the belt length in the first winding device at a predetermined level.

When the detecting means confirms that the belt is wound up to a predetermined point, the first winding device may stop winding the shoulder belt. Therefore, the seat belt can be pulled out again.

When an occupant is wearing the shoulder belt and the lap belt, only the second winding device creates a winding force, and the first winding device does not drive. Therefore, the occupant can be comfortably restrained in the seat due to the small force of the second winding device.

While the invention has been explained with reference to the specific embodiments of the invention, the explanation is illustrative and the invention is limited only by the appended claims.

What is claimed is:

1. A motor retractor system, comprising:

a seat belt;

a first winding device attached to one end of the seat belt and having a motor and a spool for winding the seat belt, said motor being connected to the spool so that the seat belt can be withdrawn from the spool as desired without operation of the motor, and when the motor is actuated, the motor winds the seat belt for an amount only withdrawn from the spool;

a second winding device attached to the other end of the seat belt and having a tension-applying device for always applying a tension to the belt and another spool for winding the seat belt, said tension-applying device being attached to the another spool so that when the belt is in use, only the second winding device generates tension to a wearer and the seat belt is freely withdrawn from the another spool of the second winding device while receiving tension to wind the seat belt by the tension-applying device;

a through-tongue slidably attached to the seat belt;

a buckle to be connected to the through-tongue;

a detecting device attached to at least one of the through-tongue and the buckle for detecting a release of the through-tongue from the buckle; and a control unit electrically connected to the detecting device and the first winding device, said control unit, upon detection of the release of the through-tongue from the buckle through the detecting device after withdrawing the seat belt from the first and second winding devices and connecting the through-tongue to the buckle, actuating the motor of the first winding device to wind the seat belt to the first winding device for only the amount withdrawn from the spool of the first winding device.

2. A motor retractor system according to claim 1, further comprising first and second belt-storage detecting means disposed in the first winding device and the second winding device, respectively, for detecting stored states of the belt in the respective winding devices.

3. A motor retractor system according to claim 2, wherein when the first belt-storage detecting means detects a predetermined amount, the control unit stops winding operation of the first winding device.

4. A motor retractor system according to claim 1, wherein said seat belt includes a shoulder portion connected to the first winding device, and a lap portion connected to the second winding device.

* * * * *